(12) United States Patent
Alteon et al.

(10) Patent No.: US 12,446,710 B2
(45) Date of Patent: *Oct. 21, 2025

(54) CRIB

(71) Applicants: Renande Alteon, Dorchester Center, MA (US); Joshua Alteon, Dorchester Center, MA (US); Renee Johnson, Dorchester Center, MA (US); Denice Johnson, Dorchester Center, MA (US)

(72) Inventors: Renande Alteon, Dorchester Center, MA (US); Joshua Alteon, Dorchester Center, MA (US); Renee Johnson, Dorchester Center, MA (US); Denice Johnson, Dorchester Center, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/348,043

(22) Filed: Jul. 6, 2023

(65) Prior Publication Data

US 2023/0346137 A1 Nov. 2, 2023

Related U.S. Application Data

(63) Continuation of application No. 17/467,081, filed on Sep. 3, 2021, now Pat. No. 11,696,653.

(51) Int. Cl.
  *A47D 15/00* (2006.01)
  *A47D 9/02* (2006.01)
  *G01D 21/02* (2006.01)

(52) U.S. Cl.
  CPC ............. *A47D 15/00* (2013.01); *A47D 9/057* (2022.08); *G01D 21/02* (2013.01)

(58) Field of Classification Search
  None
  See application file for complete search history.

(56) References Cited

U.S. PATENT DOCUMENTS

| | | | | |
|---|---|---|---|---|
| 2,475,775 | A * | 7/1949 | Boren | A47D 9/00 D6/390 |
| 5,398,353 | A * | 3/1995 | Sachathamakul | A47D 9/057 5/105 |
| 7,764,332 | B2 * | 7/2010 | Zhang | G02F 1/133308 349/59 |
| 8,256,041 | B1 | 9/2012 | Girdwain | |
| 8,405,604 | B2 | 3/2013 | Pryor | |
| 11,696,653 | B2 * | 7/2023 | Alteon | A47D 9/00 5/93.1 |

(Continued)

FOREIGN PATENT DOCUMENTS

| | | |
|---|---|---|
| CN | 203591092 | 5/2014 |
| WO | 2007056697 | 5/2007 |

*Primary Examiner* — Adam C Ortiz
(74) *Attorney, Agent, or Firm* — Lambert Shortell & Connaughton; David J. Connaughton, Jr.; Justin P. Tinger

(57) ABSTRACT

An improved crib is disclosed herein. The crib of the present disclosure has numerous benefits over the prior art, wherein one of the benefits is that children placed within the crib may not feel like they are trapped within a cage. In general, the crib disclosed has screens on all four sides of the crib. The screens at least comprise visual display surfaces on the faces of the screens directed toward the inside of the crib, wherein the mattress and child are located. The visual display surfaces may be operable to display calming scenery or educational content for the child in the crib. Many more embodiments are disclosed herein that are within the scope of this inventive concept.

20 Claims, 8 Drawing Sheets

(56) References Cited

U.S. PATENT DOCUMENTS

| | | |
|---|---|---|
| 2003/0151562 A1 | 8/2003 | Kulas |
| 2003/0153240 A1 | 8/2003 | DeJule |
| 2004/0259070 A1 | 12/2004 | Goodstein |
| 2007/0058039 A1 | 3/2007 | Clark |
| 2007/0143920 A1* | 6/2007 | Frondorf ............... A61G 7/05 |
| | | 5/81.1 R |
| 2009/0070929 A1 | 3/2009 | Holman |
| 2010/0134612 A1 | 6/2010 | Pryor |
| 2011/0025915 A1* | 2/2011 | Daban ................. A47C 7/72 |
| | | 348/E7.001 |
| 2011/0122368 A1 | 5/2011 | Fischer |
| 2013/0263171 A1* | 10/2013 | Calhoun ........... H04N 21/4622 |
| | | 725/110 |
| 2013/0326808 A1* | 12/2013 | Saint ................. A47D 9/016 |
| | | 5/93.1 |
| 2015/0224414 A1 | 8/2015 | Aboukrat |
| 2015/0279037 A1 | 10/2015 | Griffin |
| 2015/0302721 A1* | 10/2015 | Schmidt ............. G01G 19/445 |
| | | 5/93.1 |
| 2016/0058201 A1* | 3/2016 | Pavkov .............. A47D 13/107 |
| | | 297/440.22 |
| 2016/0183695 A1* | 6/2016 | Veron ............... G08B 21/0205 |
| | | 5/93.1 |
| 2020/0268172 A1* | 8/2020 | El Mali ............... A61B 5/6891 |
| 2022/0312987 A1* | 10/2022 | Kirtikar .............. A47C 20/041 |
| 2022/0313514 A1* | 10/2022 | Kirtikar .............. A61G 7/012 |

\* cited by examiner

CRIB

BACKGROUND

Technical Field

The present disclosure relates generally to an improved crib. More particularly, the present disclosure relates to a crib comprising a plurality of screens, or a crib comprising a plexiglass barrier having a plurality of screens thereon in the place of the barred or latticed sides of the types of cribs known in the art.

Description of Related Art

Cribs for cradling infants and toddlers while they sleep have been around for hundreds of years. The modern crib typically has at least one or more barred or latticed sides that prevent the baby from falling out of the crib during sleep, while still allowing babies to view their surroundings through the sides of the crib. However, there are a number of potential issues with the modern crib to which there are a countless number of potential solutions.

One of the problems is that the barred or latticed sides of the crib are analogous to a jail cell, and may cause the child in the crib to feel like they are trapped in a cage.

Therefore what is needed is an improved crib having the following characteristics and benefits over the prior art.

SUMMARY

The subject matter of this application may involve, in some cases, interrelated products, alternative solutions to a particular problem, and/or a plurality of different uses of a single system or article.

In one aspect, a crib is disclosed. The crib may comprise a base, wherein the base comprises four sides and a plurality of supporting legs connected to the base. The crib may also comprise four screens, wherein each one of the four screens is connected to one of the four sides of the base and each one of the four screens is connected to another two of the four screens. The crib may also comprise a mattress, wherein the mattress is supported by the base and surrounded inside the crib by the four screens.

In another aspect, a crib is disclosed. The crib may comprise a base, wherein the base comprises four sides and a plurality of supporting legs connected to the base. This aspect also includes four transparent barriers, wherein each one of the four transparent barriers is connected to one of the four sides of the base and each one of the four transparent barriers is connected to another two of the four transparent barriers. This aspect of the crib also comprises a plurality of screens, wherein each one of the four transparent barriers is connected to at least one of the plurality of screens. The crib also has a mattress inside the crib and surrounded by the plurality of screens connected to the four transparent barriers.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

Figure 1:
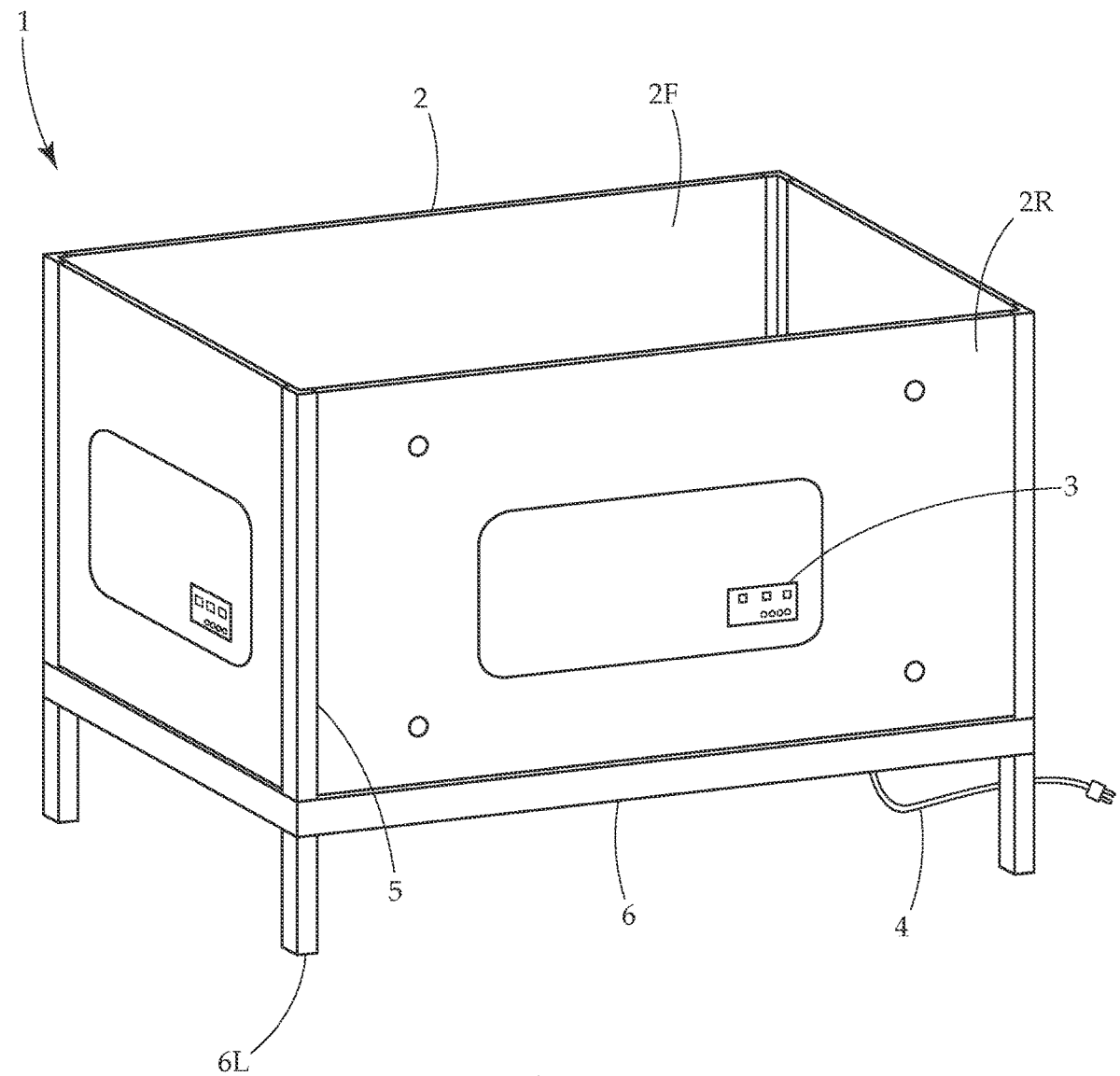
FIG. 1 provides a perspective view of an embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns an improved crib which may comprise at least a base, a mattress, and at least one screen attached to the base of the crib. In many embodiments hereinafter described, the screen may generally comprise at least a visual display surface on a front face of the screen, and a back cover on a rear face of the screen; however, at least one other type of screen is described herein.

In one embodiment, it may be said that either the base of the crib or the crib itself has four sides, and the at least one screen may be attached to one of the four sides of the base or crib. In an embodiment where the crib comprises only one screen on one of the four sides of the crib, the other three sides of the crib may comprise either bars or lattices attached to the base of the crib and extending upward perpendicular to the plane of the base. In such an embodiment, the tops of the bars or lattices may connect to a horizontal piece parallel with the plane of the base. In such an embodiment, the one screen attached to one of the four sides of the base may comprise a visual display surface, wherein the screen may be operable to display educational material, calming scenery, or other types of images or videos on the visual display surface for a child placed in the crib. This may have the effect of calming or entertaining the child to such an extent that the child may no longer feel trapped and isolated in the crib.

In more embodiments, a more immersive experience for the child is disclosed, wherein more than one screen may be attached to the base of the crib. As a non-exhaustive example of such embodiments, two screens may be attached to two of the four sides of a base of the crib, and the other two sides of the base or crib may comprise bars or lattices topped by horizontal pieces. In a preferred embodiment, the crib may comprise four screens and each one of the four sides of the base of the crib may be attached to one of the four screens. This preferred embodiment may provide the most immersive experience for a child placed in the crib.

In most of the embodiments hereinbefore described, those skilled in the art may believe only a rectangular or square crib is contemplated and disclosed; however, as will be appreciated by those skilled in the art, the base of a crib may define other shapes. As a non-exhaustive example of such embodiments, the base of the crib may define an oval or a circle. In embodiments where the base of the crib defines such a shape, the crib may still be said to comprise either a screen on each one of the four sides of the crib or a continuous screen surrounding the inside of the crib. In these embodiments, such a screen or screens, may define a concave shape with respect to the inside of the crib in order to properly attach to the base of the crib. In such embodiments, it may be said that the front face of a screen defines a concave shape with respect to the inside of the crib, and the rear face of the screen defines a convex shape with respect to the outside of the crib.

In some embodiments, both the rear faces and front faces of the screens may comprise visual display surfaces. In such embodiments, the screens may be referred to as "transparent screens." In some embodiments, the transparent screens may have an adjustable range of transparency such that the transparent screens may be operable to become translucent or opaque. In some embodiments, the transparent screens may become opaque by displaying the color black on at least one of the visual display surfaces. Further, in some embodiments, the transparent screens may be organic light emitting diode (OLED) screens. In such embodiments, the transparent OLED screens may comprise an organic electroluminescent material between the two visual display surfaces. In embodiments where the mattress inside of the crib is surrounded by screens (i.e., wherein each one of the four sides of the crib is attached to one of four screens), the screens being transparent screens may allow the crib to be adjustably see-through for parents or guardians of the child, wherein the parents or guardians would be able to make at least one of the screens darker (i.e., more opaque, less transparent) or lighter (i.e., less opaque, more transparent) so the parents or guardians would be able to not see or see the child at their preference.

In another embodiment, the crib may comprise at least one transparent barrier attached to the base of the crib. In another preferred embodiment, the crib may comprise four transparent barriers attached to each one of the four sides of the base. In some embodiments, the transparent barriers may be made from a baby safe material. As a non-exhaustive example of such material, the transparent barriers may be made of an acrylic material, such as Plexiglas®. In other embodiments, the transparent barriers may be made of a polycarbonate material, such as Lexan®. Similar to embodiments previously disclosed herein, those skilled in the art may believe only a rectangular or square crib is contemplated and disclosed; however, as will be appreciated by those skilled in the art, the base of a crib may define other shapes. As a non-exhaustive example of such embodiments, the base of the crib may define an oval or a circle. In embodiments where the base of the crib defines such a shape, the crib may still be said to comprise either a transparent barrier on each one of the four sides of the crib or a continuous transparent barrier surrounding the inside of the crib. In these embodiments, such a transparent barrier or barriers, may define a concave shape with respect to the inside of the crib and define a convex shape with respect to the outside of the crib in order to properly attach to the base of the crib.

In embodiments of the crib that utilize transparent barriers, the crib also comprises a plurality of screens. In some embodiments, at least one of the plurality of screens is attached to at least one of the transparent barriers. In other embodiments, at least one of the plurality of screens is attached to at least one side of the base. In yet other embodiments, at least one of the plurality of screens is attached to at least one of the transparent barriers, and another one of the plurality of screens is attached to one side of the base, simultaneously. However, in a preferred embodiment, the crib comprises six screens and four transparent barriers, wherein two screens are attached to two of four transparent barriers, and one screen is attached to the other two of the four transparent barriers. In embodiments where the screens are attached to the transparent barriers, the transparent barriers may comprise a plurality of tracks for the screens to slidably attach to.

In some embodiments of the crib comprising transparent barriers, the tracks may be positioned to allow the screens to move in multiple directions. As a non-exhaustive example of such positioning, the tracks may be positioned vertically with respect to the base, horizontally with respect to the base, or diagonally with respect to the base, which may allow the screens to move vertically, horizontally, or diagonally, respectively, with respect to the base. Alternatively or simultaneously, the tracks may form a half circle or a quarter circle with respect to the base, which may allow the screens to move in an arc with respect to the base. Depending on the embodiment, uniform or various track positions and/or geometries may be defined in a single transparent barrier. For example, in some embodiments, a transparent barrier may comprise only vertical tracks (i.e., uniform positioning). In other embodiments, a transparent barrier may comprise both vertical and diagonal tracks (i.e., various positioning).

In embodiments where a transparent barrier is attached to more than one screen, the various positioning of the tracks connected to each screen on the transparent barrier may allow each screen to be adjustably moved with respect to another screen. In other words, the various positioning of the tracks may allow two or more screens attached to the same transparent barrier to move closer or further apart from one another. Screens that may be moved closer or further apart may be hereinafter referred to individually or collectively as "separable," and various positioning of the tracks is not the only method contemplated or disclosed by which screens may be separable. As a non-exhaustive example, even in embodiments where a transparent barrier comprises uniform track positioning, such as uniform horizontal track positioning or uniform diagonal track positions, two or more screens attached to the tracks on the barrier may be horizontally or diagonally separable.

Embodiments with separable screens attached to the transparent barriers allow for the screens to be divided, which may enable a child inside the crib to see their surroundings through the transparent barriers. However, other embodiments of the crib may also enable a child inside the crib to see their surroundings without the use of separable screens. A non-exhaustive example of one such embodiment is an embodiment of the crib having screens attached to all four sides of the base that also comprises a camera attached to each one of the four sides of the crib. In some embodiments, a camera is connected to each rear face of the screens. In one embodiment, the cameras may be connected to each rear face of the screens by being placed in a housing defined in the back cover of the screen. In another embodiment, each camera may be electrically connected to a connection port array on the back of the screen and physically connected to either the base or a screen. In yet another embodiment, each camera may be electrically connected to a connection port array on the back cover of each screen and physically supported by a camera stand placed on a surface, such as a floor, outside of the crib. As used herein and throughout this disclosure, the term "electrically connected" shall mean connected by at least one electrical wire. Additionally, when an element of the present disclosure that would require an electrical connection to be operable is said to merely be connected to another element, it should be expressly understood that such an electrical element may be electrically connected to that other element also, or alternatively, that electrical power is supplied to the electrical element in some way, such as a battery or a power cord attached to a power plug.

In yet more embodiments of the present disclosure, it may be advantageous for parents or guardians of a child in the crib to be able to monitor the child, either visually or through an alert system. In one embodiment, a camera is connected to each front face of the screens, and the video taken by the camera may be wirelessly transmitted to a mobile device to enable the parents or guardian to see the child. In another embodiment, the parents or guardian of the child may monitor the child through the use of an alert system, such as a sensor system configured to detect any irregularities in breathing or movement of the child. Accordingly, in one embodiment, the crib may have sensors located between the base of the crib and the mattress. The sensors may be electrically connected within the base of the crib and may detect the breathing of the child based on movements on the underside of the mattress that occur when the child breathes. The sensor system may be configured to alert the parents or guardians on a mobile device when the child's breathing stops or becomes irregular. As will be discussed further, the crib may contain the appropriate hardware and electrical connections necessary for either the cameras or the sensors to wirelessly communicate with a mobile device accessible to the parents and guardians. As a non-exhaustive example, the crib may comprise a wireless transceiver housed within the base of the crib that is electrically connected to either the cameras, the sensors, or both, depending on the embodiment, capable of wirelessly transmitting visual or movement related data to the parents' or guardians' mobile device. Alternatively, the camera or the sensors themselves may comprise such a wireless transceiver.

In yet more embodiments, parents or guardians who are not physically in the same room as the child in the crib may desire the ability to calm the child without needing to physically rock or move the crib. Accordingly, in some embodiments, the crib may be self-rocking. In one embodiment, the base of the crib may be connected to the plurality of supporting legs by a rocking mechanism. The rocking mechanism may be connected to an electric motor within the base of the crib, wherein the electric motor may be operated wirelessly via a mobile device. In this embodiment, the rocking mechanism may translate the rotational motion of the electric rocking motor into a smooth rocking motion of the crib, which may have the effect of calming a child in the crib. In another embodiment, the crib may vibrate, which may also have a calming effect on the child in the crib. In such an embodiment, the crib may also comprise at least one electric motor, wherein the electric motor is a vibration motor. Different than a rocking motor, the vibration motor may comprise an unbalanced weight that, when caused to rotate by the electric vibration motor, may cause the motor itself to vibrate due to the uneven weight being spun by the vibration motor. The vibration of the at least one vibration motor may, in turn, cause the base of the crib, and accordingly, the crib itself to vibrate, which may calm an upset child.

Turning now to FIG. 1 which shows an embodiment of the crib 1, wherein the crib 1 comprises screens 2 on each of the four sides. Each of the screens 2 has a front face 2F and a rear face 2R. The front faces 2F of the screens 2 face the inside of the crib 1, and the rear faces 2R of the screens 2 face the outside of the crib 1. In the embodiment shown in FIG. 1, the front faces 2F of the screens 2 are visual display surfaces, and the rear faces 2R of the screens 2 are back covers. Also, the rear faces 2R of the screens 2 each comprise a connection port array 3, and each screen 2 is connected to two other screens by two corner pieces 5. In some embodiments, the connection port array may comprise a plurality of connections, such as an HDMI port, a power port, or other ports that may be necessary for operation of the screens 2. Each corner piece 5 connects a first screen 2A and a second screen 2B at one of the sides of the first screen 2A and one of the sides of the second screen 2B, respectively (shown in FIG. 3). Also, in the embodiment shown in FIG. 1, the four interconnected screens 2 are also connected to and supported by a base 6. The base 6 comprises four supporting legs 6L. Also, the crib 1 comprises an electric power cord 4 extending from the base 6. In the embodiment shown in FIG. 1, the electric power cord 4 is plugged into a power outlet (not shown) to provide electric power to the screens 2.

Figure 2:
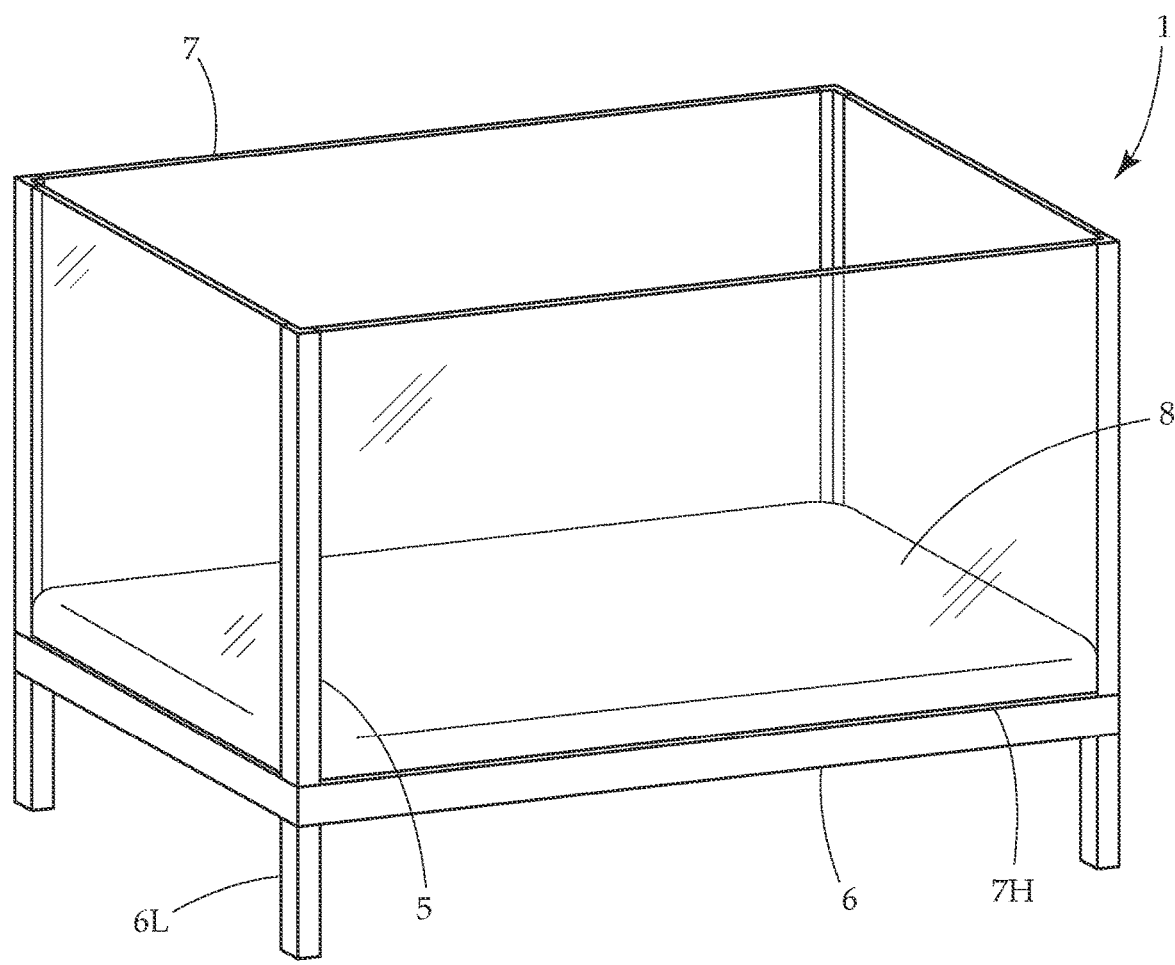
FIG. 2 provides a perspective view of another embodiment of the present disclosure.

FIG. 2 shows another embodiment of the crib 1. In this embodiment, the crib 1 comprises screens 7 on each of the four sides of the crib 1. The screens 7 are transparent OLED screens 7 that allow viewers outside the crib 1 to see the mattress 8 and baby (not shown) inside the crib 1. The screens 7 are connected to each other by four corner pieces 5, which are positioned at each of the corners of the crib 1. Each screen 7 is also connected to and supported by a base housing 7H, which, in the embodiment shown in FIG. 2, houses electrical components (not shown) for operating the OLED screens 7. The base housings 7H, which connect and support the screens 7 are connected to and supported by the base 6 of the crib 1. The base 6 comprises four legs 6L and also supports the mattress 8. In this FIG. 2 embodiment, the base housings 7H are electrically connected to the base 6 of the crib 1, and the base 6 provides electric power to the screens 7 via a rechargeable battery 17 (shown in FIG. 9).

Figure 3:
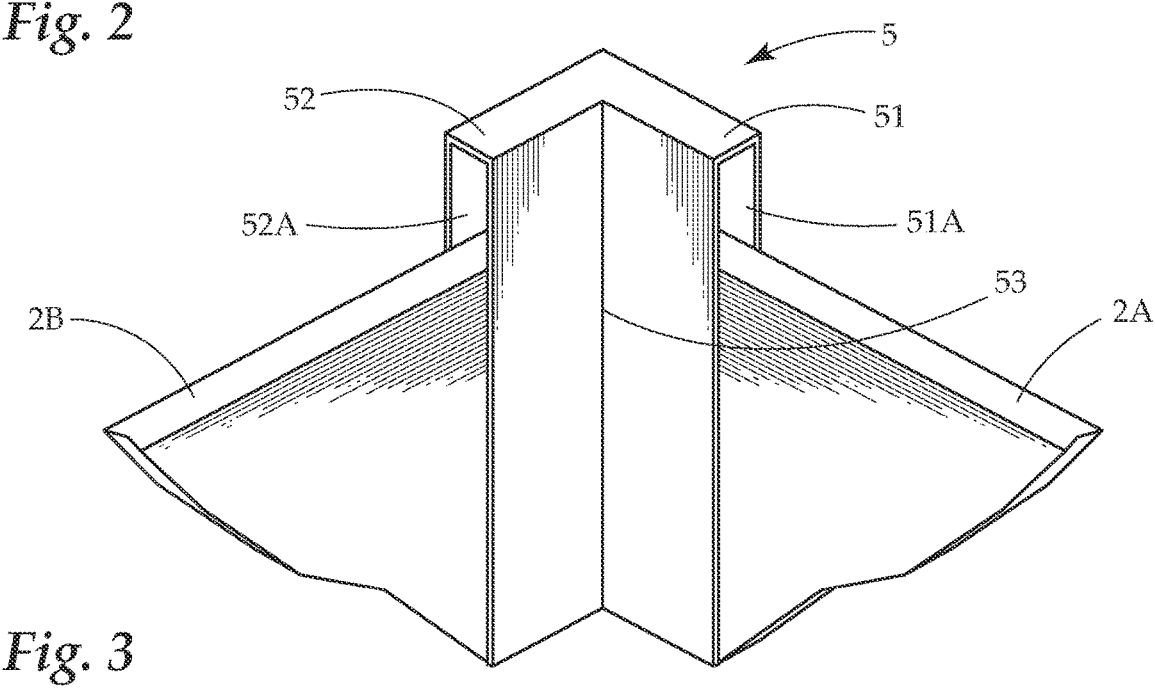
FIG. 3 provides a close-up perspective view of an embodiment of the present disclosure.

FIG. 3 shows a close-up view of an embodiment where a corner piece 5 connects the sides of a first screen 2A and a second screen 2B. In this embodiment, the corner piece 5 comprises a first section 51 and a second section 52, which are separated by an angle 53. In this embodiment, the angle 53 separating the first section 51 and the second section 52 is substantially a right angle (i.e., approximately 90°). In this embodiment, the first section 51 and the second section 52 define a first aperture 51A and a second aperture 52A, respectively. Both the first aperture 51A and the second aperture 52A, individually, define a cross sectional area greater than the cross sectional area of the first screen 2A and the second screen 2B, individually and respectively, such that the corner piece 5 fits over and connects the two screens 2A and 2B.

Figure 4:
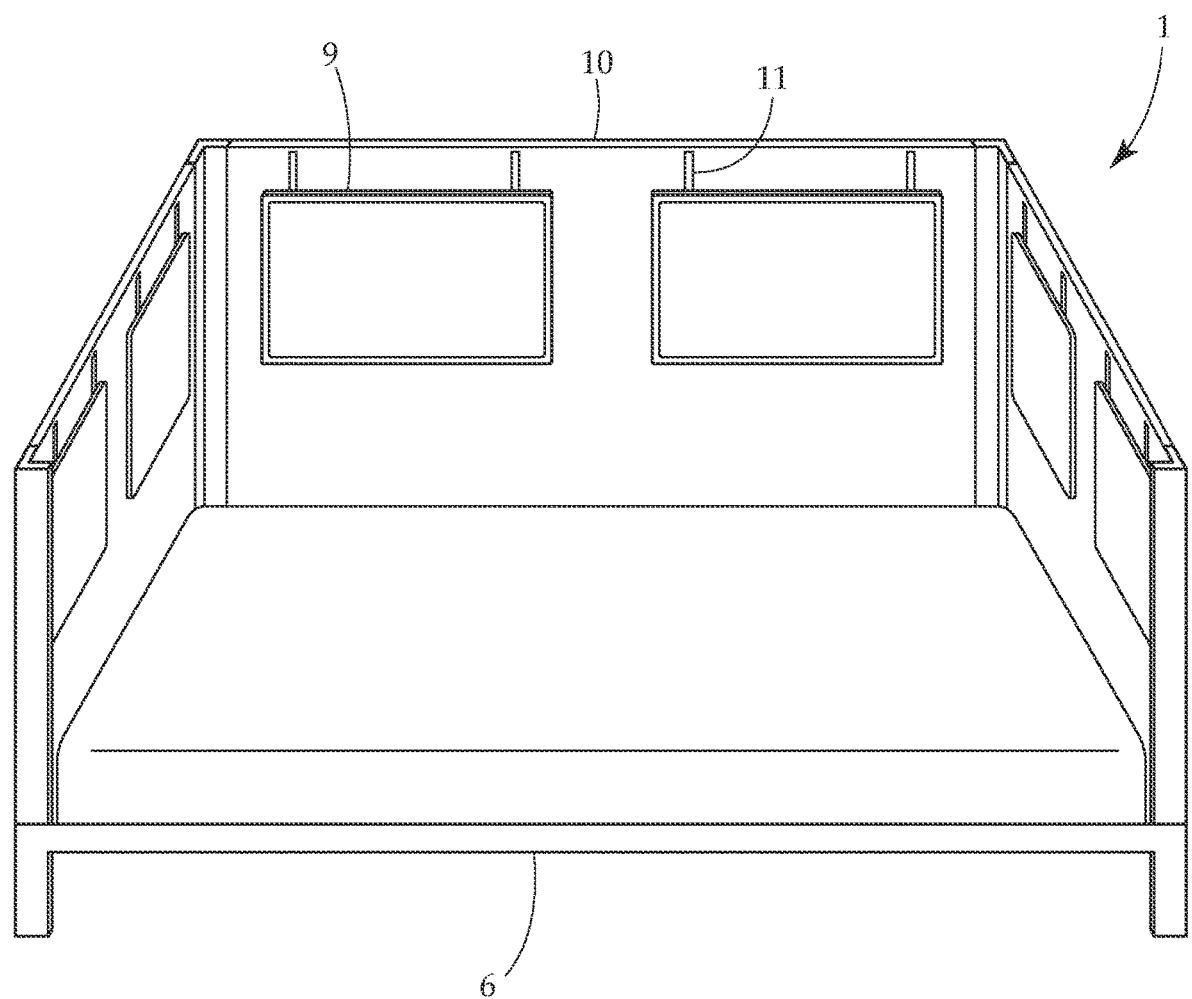
FIG. 4 provides a cross sectional perspective view of another embodiment of the present disclosure.
Figure 5:
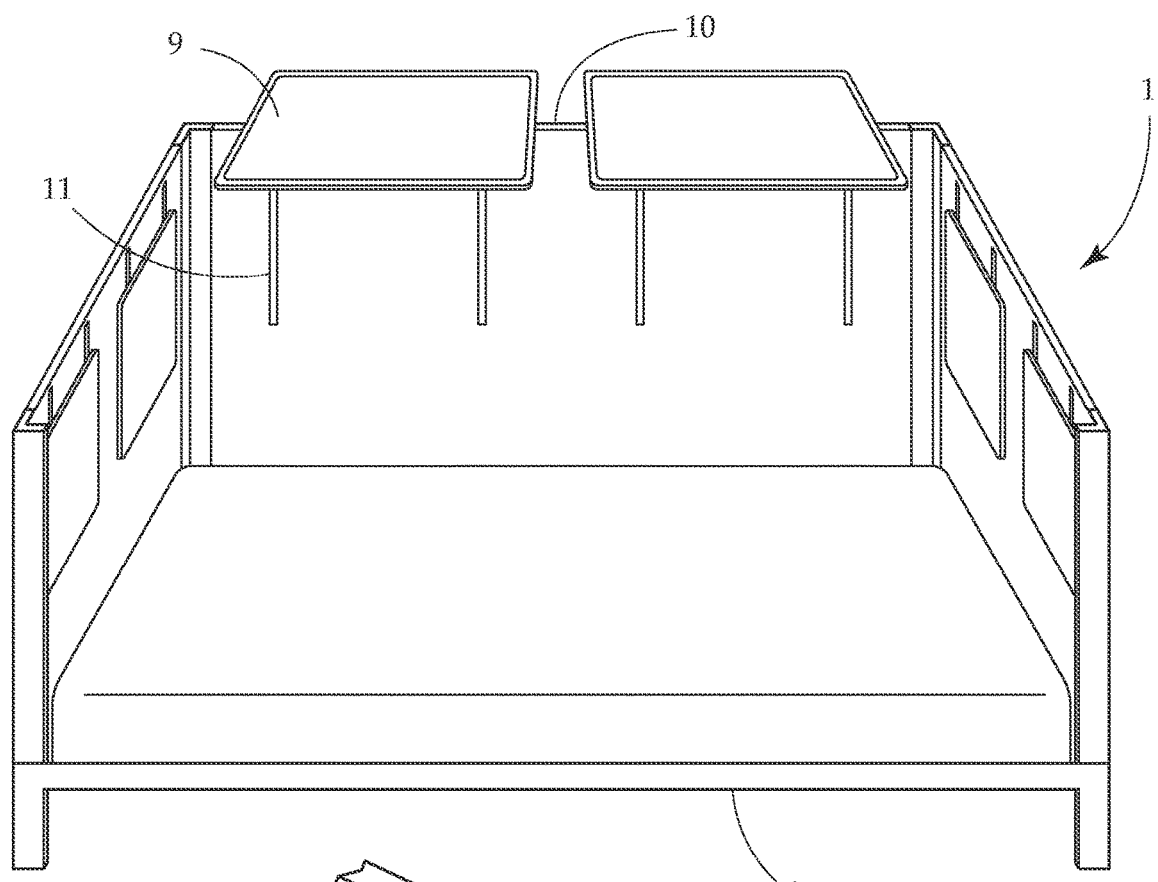
FIG. 5 provides another cross sectional perspective view of the same embodiment of the present disclosure as FIG. 4.

FIG. 4 and FIG. 5 show two different cross sectional perspective views of another embodiment of the crib 1 having transparent barriers 10 on all four sides of the crib 1. In the embodiments shown in FIG. 4 and FIG. 5, the transparent barriers 10 are made of a transparent acrylic material, such as Plexiglas®. The crib 1 further comprises screens 9 that are smaller and divided, unlike the screens 2 or 7 from the embodiments shown in FIG. 1 and FIG. 2, respectively. Similar to the embodiments shown in FIG. 1 and FIG. 2, the transparent barriers 10 in FIG. 4 and FIG. 5 are connected to and supported by the base 6 of the crib 1. In the embodiment shown in FIG. 4 and FIG. 5, the screens 9 are connected to the transparent barriers 10, and the screens 9 are movable via tracks 11 in the transparent barriers 10.

Figure 6:
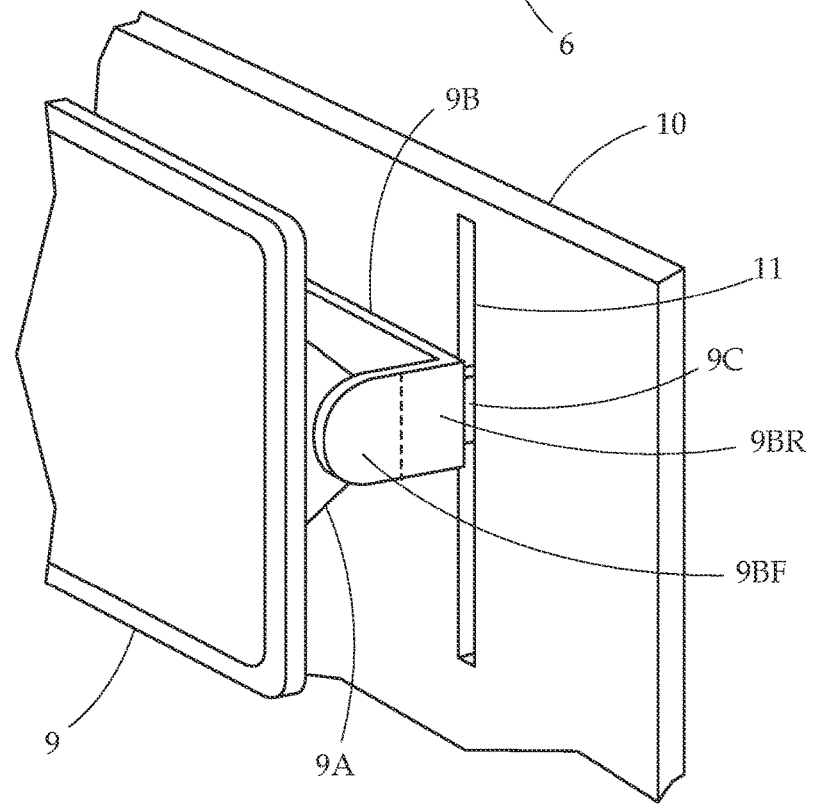
FIG. 6 provides a close-up perspective view of an embodiment of the present disclosure.

FIG. 6 shows a close-up perspective view of a connection between a screen 9 and a track 11 of one of the transparent barriers 10. In the embodiment shown in FIG. 6, the screen 9 is attached to a concave connector 9A, and the concave connector 9A is hingedly connected to a center connector 9B, which allows the screen to tilt back and forth with respect to an axis perpendicular to the center connector 9B. The center connector 9B has a front face 9BF and a rear face 9BR. The front face 9BF defines a convex curve and is connected to the concave connector 9A, and the rear face 9BR defines a substantially flat surface and is connected to a track slider 9C. In the embodiment shown in FIG. 6, the track slider 9C is connected to and can slide up and down track 11, which is vertically defined in the transparent barrier 10. In some embodiments where uniform vertical track positioning is used on the transparent barrier 10, as shown by way of exemplary embodiments in FIGS. 4-6, two or more screens 9 attached to the vertical tracks 11 may be separable by being rotatably attached to the concave connector 9A. In such embodiments, the rotatable connection between the screen 9 and the concave connector 9A may allow the screen 9 to be rotated clockwise or counter-clockwise.

Figure 7:
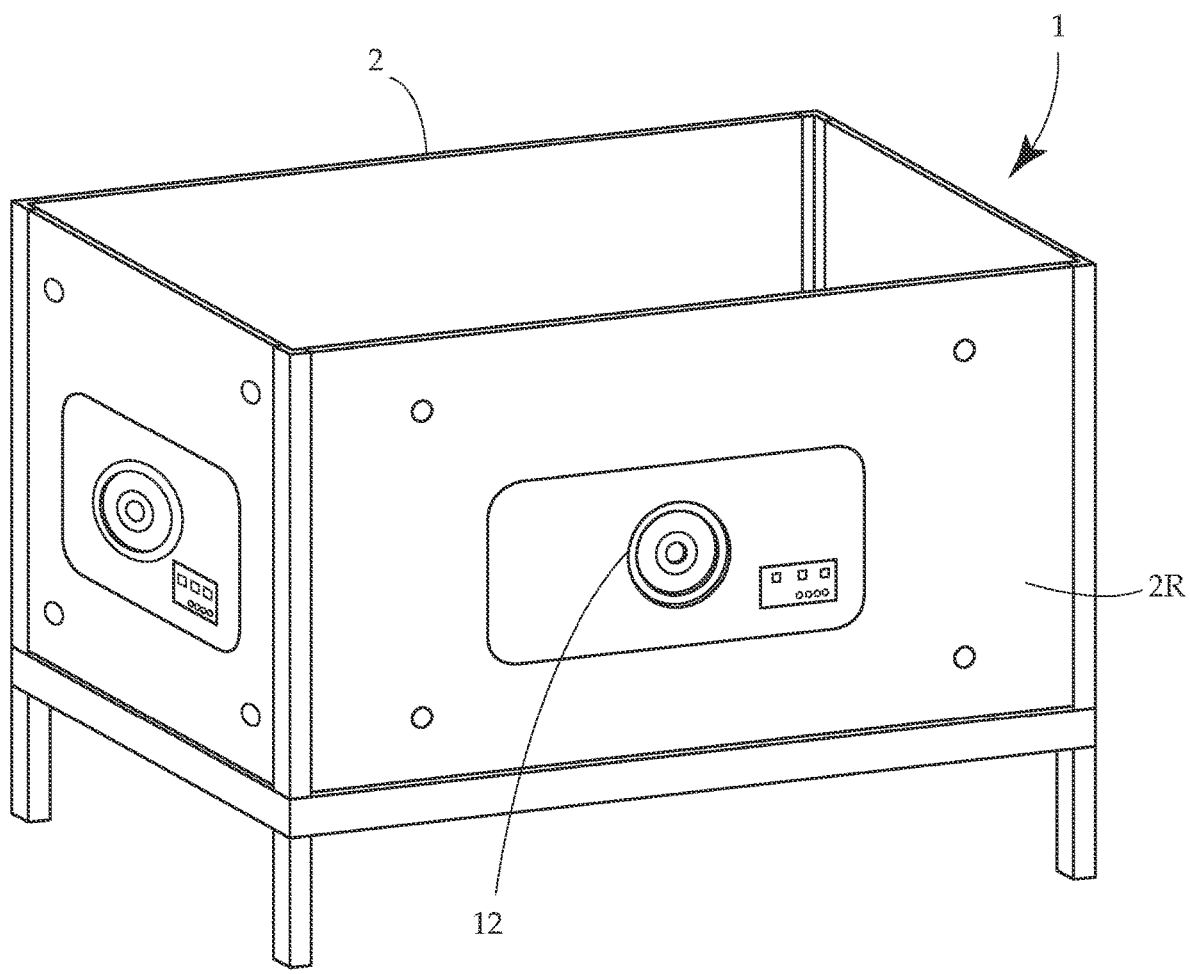
FIG. 7 provides a perspective view of another embodiment of the present disclosure.

FIG. 7 shows an embodiment of the crib 1 similar to the embodiment shown in FIG. 1. In the embodiment shown in FIG. 7, the crib 1 comprises screens 2 on all four sides of the crib 1, and the rear face 2R of each of the screens 2 comprises a camera 12. The cameras 12 face the outside of the crib 1, and the cameras 12 are able to record video and present the video on the screens 2. In this way, a child inside the crib 1 is able to view the exterior of the crib 1, despite being surrounded by screens 2.

Figure 8:
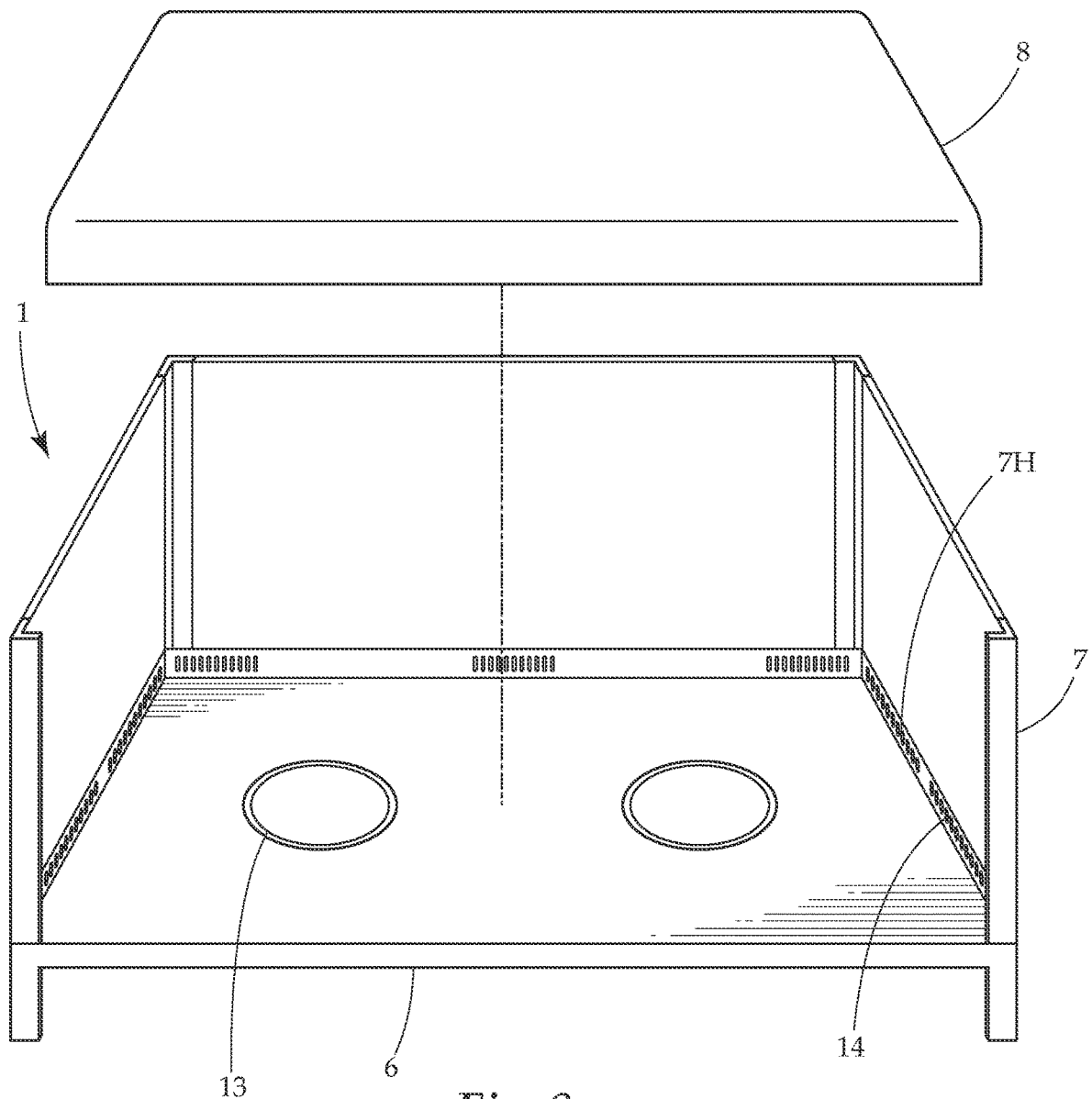
FIG. 8 provides a cross sectional perspective view of an embodiment of the present disclosure.

FIG. 8 shows a cross sectional perspective view of another embodiment of the crib 1. In the embodiment shown in FIG. 8, the crib 1 comprises screens 7 on all four sides of the crib 1. Each screen 7 is connected to and supported by a base housing 7H, and the base housings 7H define speaker grilles 14 on the exterior of the base housings 7H, wherein the speaker grilles 14 allow sound waves to better propagate from the speakers (not shown) electrically connected within the interior of the base housings 7H. The embodiment of the crib 1 shown in FIG. 8 also comprises sensors 13 that are electrically connected within the base 6 of the crib 1. These sensors 13 are supported by the base 6 and positioned under the mattress 8. The sensors 13 detect the breathing of the child through the mattress 8. The sensors 13 are capable of alerting the child's parents or other caretaker if the child's breathing becomes irregular or suddenly stops.

Figure 9:
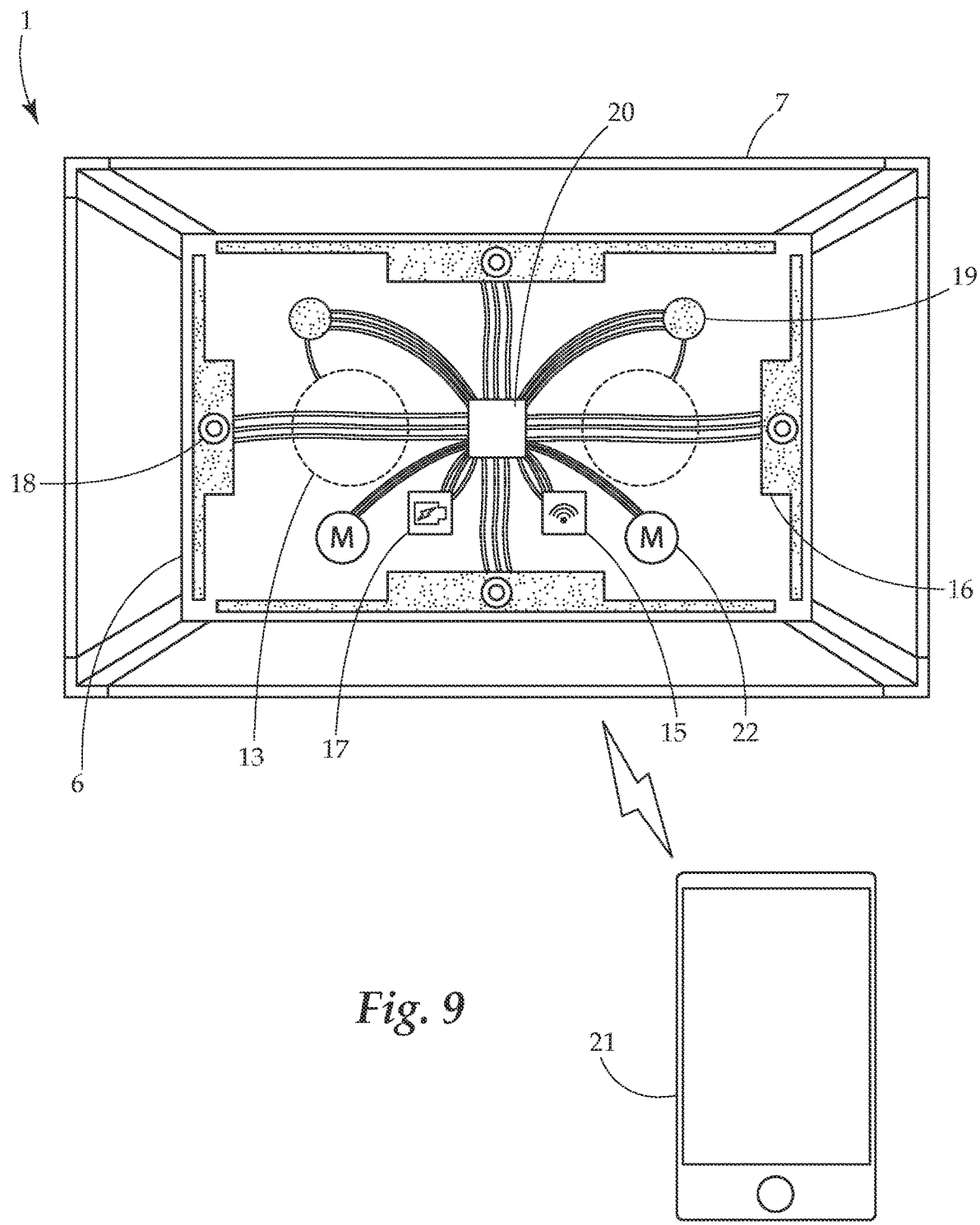
FIG. 9 provides a top-down cross sectional perspective view of another embodiment of the present disclosure.

FIG. 9 provides a top-down cross sectional perspective view of circuitry within the base 6 of the crib 1. In the embodiment shown in FIG. 9, the hardware and circuitry necessary to operate the screens 7 and the crib 1 are housed within the base 6. For example, the base 6 houses circuit boards 16 that electrically connect to each screen 7, individually. In this embodiment, each individual circuit board 16 for the screens 7 comprises a speaker 18 electrically connected to the circuit board 16, and each circuit board 16 is electrically connected to a central control board 20. The sensors 13, which are supported on the exterior of the base 6, are also electrically connected to circuit boards 19. The circuit boards 19 for the sensors 13 are ultimately electrically connected to the central control board 20. In this embodiment, the crib 1 and each of its components (e.g., the screens 7, the sensors 13, etc.) are electrically powered by a rechargeable battery 17. In the embodiment shown in FIG. 9, the crib 1 also has at least one electric motor 22 electrically connected to the central control board 20. In the embodiment shown in FIG. 9, the electric motor 22 is a vibration motor that causes the crib 1 to soothingly vibrate when the motor 22 is in operation. In the embodiment shown in FIG. 10, the electric motor 22 is a rocking motor that causes the crib to rock when the motor 22 is in operation. Some embodiments may comprise both a vibration motor and a rocking motor. Additionally, as shown in FIG. 9, the crib 1 and each of its components can also be connected to the internet or to another device via a low-latency wireless connection, such as Bluetooth®. The crib 1 and associated components may be controlled via an application on a mobile device 21 due to the wireless transceiver 15 housed within the base 6 of the crib 1 communicating with either the internet, the mobile device 21 directly, or both.

Figure 10:
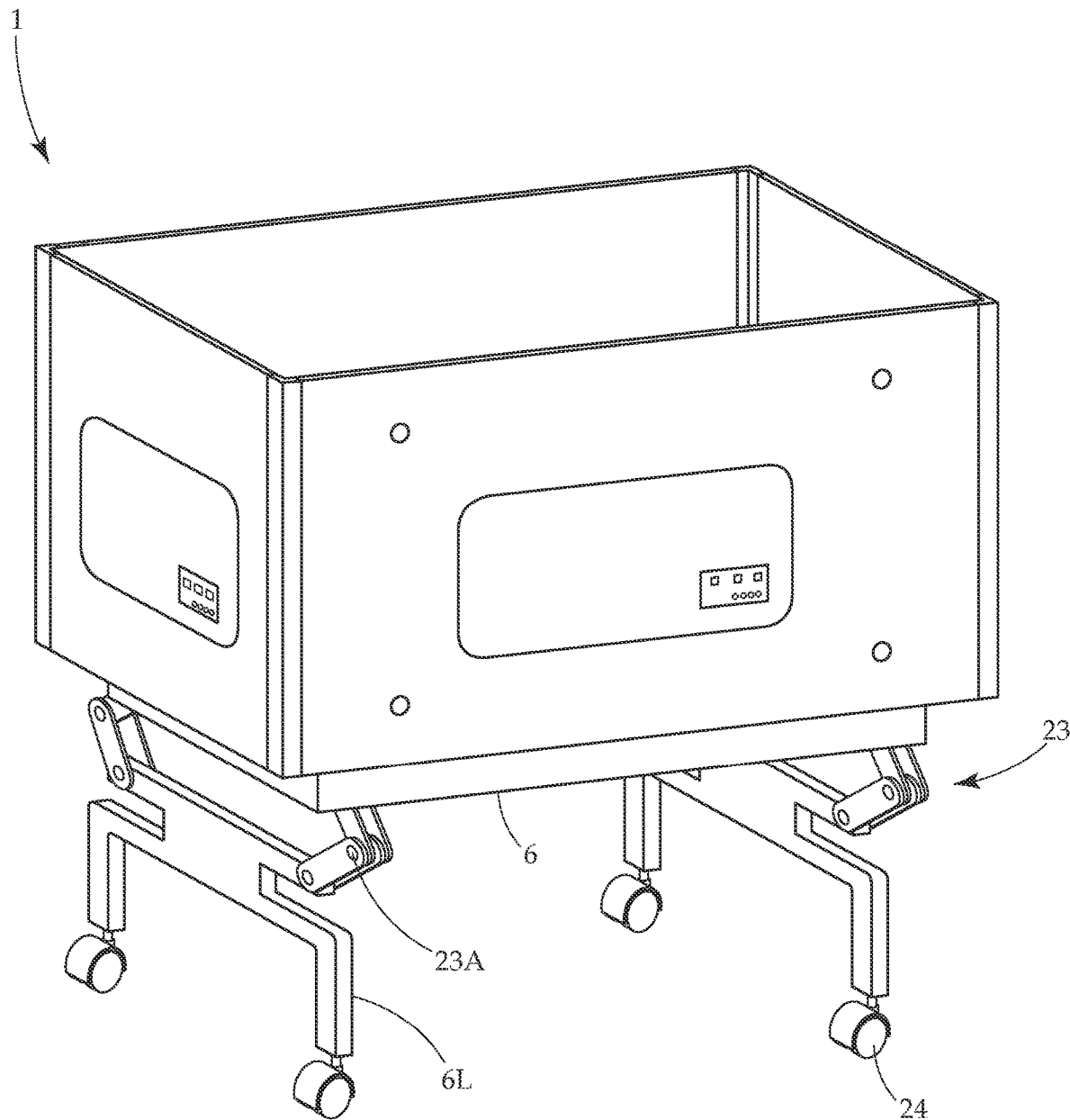
FIG. 10 provides a perspective view of another embodiment of the present disclosure.

FIG. 10 provides a perspective view of an embodiment of the crib 1 that rocks back and forth. In this embodiment, the crib 1 has a rocking mechanism 23 connected to both the base 6 of the crib 1 and the plurality of legs 6L of the crib 1. Also in this embodiment, the rocking mechanism 23 comprises a plurality of rocking arms 23A that translate the linear motion of a push, for example, into the rotational motion necessary to rock the crib 1. The crib 1 shown in FIG. 10 may also be self-rocking. In this embodiment, at least one of the plurality of rocking arms 23A is connected to a rocking motor within the base 6 of the crib 1. The crib 1 then rocks when the rocking motor is in operation due to the rocking mechanism 23 translating the rotational motion of the rocking motor into a rocking motion. The crib 1 may also comprise a plurality of wheels 24 connected to the plurality of legs 6L to allow for easier mobility of the crib 1.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth.

What is claimed is:

1. A crib comprising:
   a base comprising four sides;
   four side walls connected to the base;
   a plurality of supporting legs connected to the base;
   a plurality of electronic screens comprising a plurality of visual display surfaces;
   wherein each of the plurality of electronic screens is configured to project images or videos on each of the plurality of visual display surfaces;
   wherein the plurality of electronic screens forms the four side walls of the base.

2. The crib of claim 1, wherein each of the plurality of electronic screens comprises a front face and a rear face.

3. The crib of claim 2, wherein the front face of each the plurality of electronic screens is the visual display surface and the rear face of each of the plurality of electronic screens is a back cover.

4. The crib of claim 3, wherein the back cover of each of the plurality of electronic screens comprises a connection port array.

5. The crib of claim 1 further comprising four corner pieces, wherein each one of the four side walls is connected to another two of the four side walls by two of the plurality of corner pieces.

6. The crib of claim 5, wherein each one of the four corner pieces comprises a first section defining a first aperture and a second section defining a second aperture, wherein the first section and the second section are separated by an angle.

7. The crib of claim 6, wherein each one of the four corner pieces connects a side of a first one of the four side walls with a side of a second one of the four side walls.

8. The crib of claim 7, wherein the first aperture is fit over the side of the first one of the four side walls and the second aperture is fit over the side of the second one of four side walls.

9. The crib of claim 1, wherein each one of the four side walls is a transparent electronic screen comprising a base housing.

10. The crib of claim 1 further comprising at least one rocking mechanism and at least one rocking motor.

11. The crib of claim 10 wherein the at least one rocking mechanism is connected to the base of the crib, and the at least one rocking motor is housed within the base of the crib.

12. The crib of claim 1 further comprising at least one vibration motor, wherein the at least one vibration motor is housed within the base of the crib.

13. The crib of claim 12 wherein the at least one vibration motor is electrically connected to a circuit board housed within the base of the crib.

14. The crib of claim 1 further comprising a plurality of cameras, wherein each one of the plurality of cameras is connected to one of the four side walls of the crib.

15. The crib of claim 1 further comprising a plurality of sensors electrically connected within the base of the crib.

16. The crib of claim 15 wherein the plurality of sensors is positioned between the base and a mattress.

17. The crib of claim 16 wherein the plurality of sensors is supported by the base and contact the mattress.

18. The crib of claim 1 further comprising a plurality of circuit boards within the base of the crib, wherein at least one of the plurality of circuit boards comprises a speaker electrically connected to the at least one of the plurality of circuit boards.

19. The crib of claim 1 further comprising a wireless transceiver electrically connected to a circuit board within the base of the crib.

20. The crib of claim 1 further comprising a plurality of circuit boards electrically connected to a central control board, wherein the plurality of circuit boards and the central control board are housed within the base of the crib.

* * * * *